United States Patent [19]

Burow

[11] 4,052,498
[45] Oct. 4, 1977

[54] GUIDE APPARATUS FOR DEFLECTING A LINEAR STRUCTURE

[75] Inventor: Burghard Burow, Radevormwald, Germany

[73] Assignee: Barmag Barmer Maschinenfabrik Aktiengesellschaft, Wuppertal, Germany

[21] Appl. No.: 765,998

[22] Filed: Feb. 7, 1977

Related U.S. Application Data

[62] Division of Ser. No. 670,142, March 25, 1976.

[30] Foreign Application Priority Data

Mar. 29, 1975 Germany .............................. 2514072

[51] Int. Cl.$^2$ ................................................ F16L 9/22
[52] U.S. Cl. ..................................... 264/261; 138/155; 156/201; 156/245; 156/297; 156/305; 264/262; 264/263; 264/275; 264/279; 264/313; 425/DIG. 14; 428/36
[58] Field of Search .............. 264/263, 262, 314, 313, 264/275, 261, 278, 279; 425/DIG. 14; 156/245, 201, 305, 297; 428/36; 138/155

[56] References Cited

U.S. PATENT DOCUMENTS

| 2,705,360 | 4/1955 | Leonhardt | 264/275 |
| 3,168,604 | 2/1965 | Kramer et al. | 264/313 |

Primary Examiner—Edward G. Whitby
Attorney, Agent, or Firm—Keil, Thompson & Shurtleff

[57] ABSTRACT

A device for deflecting a continuously supplied thread by means of a curved guide tube. The guide tube is formed of a plurality of contiguously abutting segments which are disposed between the entry and exit openings of a casing. The space between the inner wall of the casing and the outer circumference of the segments is filled with a bonding agent which fixes the segments in the desired spatial curvature for the guide tube when it hardens. Furthermore, a method for producing such device is disclosed which utilizes an expandable mandrel to hold the segments in the desired spatial curvature position prior to being fixed in position by the bonding agent.

2 Claims, 4 Drawing Figures

U.S. Patent  Oct. 4, 1977  4,052,498
FIG. 1
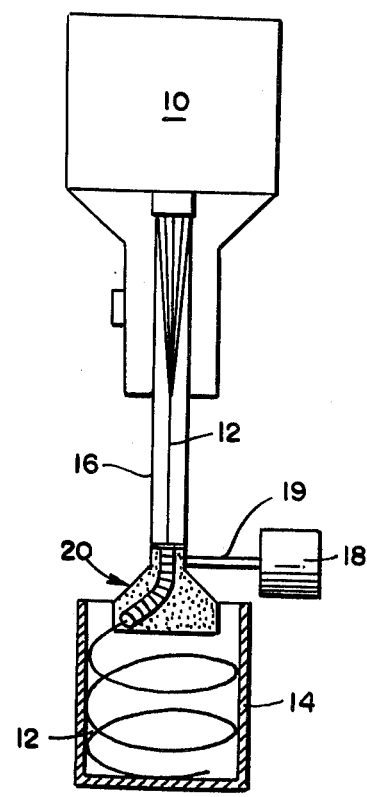
FIG. 2
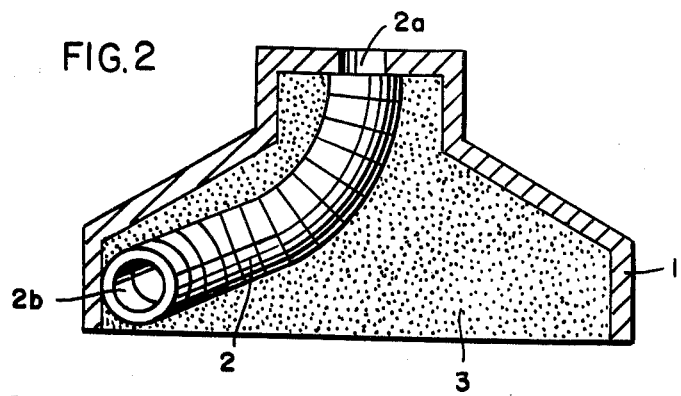
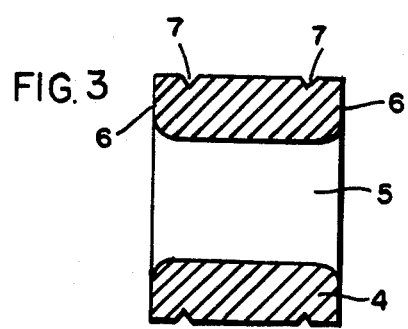
FIG. 3
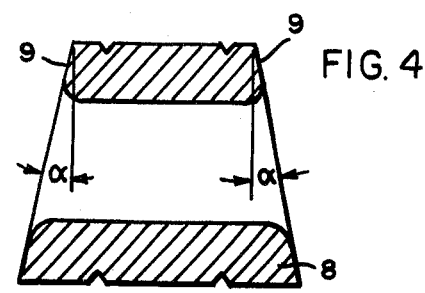
FIG. 4

GUIDE APPARATUS FOR DEFLECTING A LINEAR STRUCTURE

This is a division, of application Ser. No. 670,142, filed Mar. 25, 1976.

BACKGROUND OF THE INVENTION

The present invention relates to a device for the deflection of a continuously supplied linear structure, such as fibrous thread, yarn or tow, by means of a curved guide tube. Such two- or three-dimensionally curved guide tubes have a wide range of uses, such as in continuously operated synthetic fiber spinning machines wherein they deposit the thread into receiving cans. In such machines the guide tube deflects the vertically delivered thread to a path whose curvature corresponds to that of the side wall of the receiving can. Since the thread is in constant contact with the inner wall of the guide tube in such operations, a high demand is placed upon this inner wall with respect to surface quality and manufacturing precision.

Curved guide tubes consisting of joined individual bending sections, such as are used in pipe line construction, are unsuitable in that edges and projections are necessarily created along the inner edges of the abutting individual segments. On the other hand, continuous curved guide tubes have the disadvantage that the irregular inner surface created after they are bent can no longer be tooled or can only be tooled with considerable expenditure. Such tooling is not possible before bending since the close tooling tolerances necessary are changed during this operation.

A further known practice is to construct a curved guide tube from a series of individual straight tube segments having beveled abutting face surfaces. The faces of these segments are formed as flanges whereby the individual segments are joined. However, these seams form by their nature weak points in the guide tube, especially if the guide tube is set in rotation. In such cases the rotational loads created lead to deformation or even destruction of the device. Additional difficulties arise if the segments are formed so small in their outer dimensions that the screw-type connections ordinarily used with such segments are no longer possible. The non-releasable connections offered as alternatives, i.e., soldering, cementing or welding, are not practical since after such joining there is no possibility of performing the required after-tooling of the internal seam joints. Furthermore, with small outer dimensional segments the resulting joint surfaces are not sufficiently large enough to achieve sufficient connective strength if large rotational loads are experienced.

BRIEF DESCRIPTION OF THE INVENTION

The present invention solves the above-mentioned problems found with conventional deflection devices by providing a novel guide tube design consisting of a plurality of contiguously abutting individual segments having straight internal bores. The non-releasable joints between the segments of the present invention allow for high rotational turning speeds of the guide tube. In addition, a process is provided for the economical production of such guide tubes which utilizes an expandable mandrel.

According to an embodiment of the present invention, the segments of the guide tube are arranged in the desired curved spatial configuration in a casing which is then filled with a bonding agent. The bonding agent hardens in the space between the inner wall of the casing at the outer circumference of the segments thereby holding them in a fixed position. This arrangement assures that the resulting guide tube can be subjected to high rotational turning speeds without deformation or destruction of the device. In addition, the arrangement of the present invention allows for easy balancing of the device.

Referring now to the design of the individual segments of the present invention, since the plane of the face surfaces of the segments is at an angle to the axis of their cylindrical bores, there will result an elliptical opening being formed at these faces. Hence, since in the preferred embodiment of the invention the guide tube is formed of various segments having differing angles of inclination of the face surfaces to their respective bore axes, conventional segment designs would require that each segment be made individually in correspondence to its position along the desired curve of the guide tube and be installed only at this predetermined place. Another feature of the present invention avoids this disadvantage by allowing the guide tube to be formed of only a few fundamental segments of uniform design. This is accomplished by forming the inner bore edges of the segments in an outwardly rounded manner at the segment face surfaces. In order to allow the individual segments to be turned with respect to each other in arriving at the desired curvature of the guide tube without unacceptable mismatching or overhanging of the elliptical faces occurring, it is desirable to form the angle of inclination of the face surfaces at an angle not greater than 10°. Likewise, it is desirable that the ratios of segment length to bore diameter be not greater than 1.

In order to assure the snug face-to-face fit of the individual segments, it is desirable that their face surfaces be made substantially planar. This prevents the bonding agent from flowing between these surfaces and interfering with the desired smooth internal surface of the guide tube.

Furthermore, in order to avoid friction and reduce wear by abrasion as the fiber cable passes along the inner wall surface of the guide tube, it is desirable that the wall surface be protected by a suitable surface treatment such as by matting or by forming the entire segment body of a wear resistant material.

The method for producing the guide tube of the present invention includes the use of an expandable mandrel about which the appropriate number and type of segments are inserted. The segments are then positioned about the mandrel in a manner which results in the desired spatial curvature of the guide tube within the casing and the mandrel is expanded to hold them in this position. After hardening of the bonding agent about the segments, the mandrel is returned to its original unexpanded diameter and is removed from the resulting curved guide tube.

Through utilization of this process, it is possible to form guide tubes of any desired curvatures. However, it is to be understood that the present invention is not limited to any particular mold or casing configuration. For example, the casing may be a casting mold such as is used in pressure casting which is removed after the bonding agent hardens. Guide tubes of this type are used advantageously when high demands are placed on the inner wall surface of the guide tube, but little additional loads are created through rotation of the device.

The bonding agents utilized in the present invention may be thermosetting plastic type, such as epoxy resins, which are desirable due to their strength and weight characteristics.

DESCRIPTION OF THE DRAWINGS

FIG. 1 is a side assembly view of a fiber spinning apparatus including a deflection device constructed in accordance with an embodiment of the present invention;

FIG. 2 is a side view in section of the deflection device taken along line 2—2 of FIG. 1;

FIG. 3 is a longitudinal view in section of a segment of the deflection device shown in FIG. 2; and FIG. 4 is a longitudinal view in section of another segment of the deflection device shown in FIG. 2.

DESCRIPTION OF THE PREFERRED EMBODIMENT

FIG. 1 illustrates an apparatus 10 for spinning continuous filaments into a thread or yarn which includes a deflection device 20, constructed in accordance with an embodiment of the present invention, which is utilized for depositing the vertically delivered thread 12 about the circumference of a spinning can 14.

Referring now also to FIG. 2, deflection device 20 comprises a rotationally symmetrical casing 1 which is turnably secured to vertical feed tube 16 of spinning apparatus 10 and which widens in a funnel like form along its vertical length in the running direction of the fiber. In one embodiment of the present invention, deflection device 20 is rotated about the vertical axis of spinning can 14 and feed tube 16 by an appropriate motor drive mechanism 18 which engages casing 1 by means of a belt, gear or other appropriate mechanical linkage 19.

A guide tube 2 runs through casing 1 in a spiral manner from an entry bore 2a formed in its upper end at the axis of rotation of the deflection device 20 to an emergence or exit opening 2b formed along the outer circumference of the casing adjacent to its lower end. At emergence opening 2b, guide tube 2 issues at an angle substantially tangent to the outer circumference of casing 1.

As is best illustrated in FIGS. 2 – 4, guide tube 2 comprises a series of hollow individual segments arranged in a snug face-to-face relationship with respect to each other. The space remaining about guide tube 2 within casing 1 may be filled or cast with a synthetic resin, the function of which will be explained in greater detail below.

FIG. 3 shows an individual segment 4 having a straight cylindrical central bore 5. The inner wall of bore 5 may be coated with a layer of friction reducing material or the entire segment may be made of a suitable wear resistant material. The edges of bore 5 are outwardly rounded at both faces 6 of the segment. Faces 6 should be formed as surfaces being substantially free of pores and hair line irregularities. About the outer circumference of segment 4 adjacent to faces 6, there are formed triangular grooves 7.

FIG. 4 shows another segment 8 which differs from segment 4 in that faces 9 are inclined. The angle of inclination of face surface 9 to a line normal to the longitudinal axis of the segment is represented by the tangent value of the angle $\alpha$. This value should in most practical applications be held to a maximum of about 0.09 which physically allows for a guide tube 2 having a mean diameter of about 100 mm. Greater tangent values are generally not suitable for deflecting threads due to the resulting severe curvature of the guide tube which may cause splintering or snarling at the abutting internal edges of the segments. Furthermore, in practical use it has been found that with four basic segments having $\alpha$ inclination angles of 0°, 1.5°, 2.5° and 5° respectively, it is possible through various combinations of such segments to achieve all desirable curvatures for the guide tube.

Another aspect of the present invention involves a method for producing the curved guide tube 2 of various individual segments. According to this method an elastic mandrel which is preferably formed as a flexible pipe is inserted within casing 1 between the entry bore 2a and the exit opening 2b. Over one end of the mandrel, the diameter of which corresponds to the bore diameter of the segments, a sufficient number and array of segments are inserted the chosen sequence of which will result in the desired spatial configuration of the curve of guide tube 2. After the segments are arranged about the mandrel, it is positioned within casing 1 so that the free face surface of the first and last segments abut the inner surface of the casing at the entry and exit openings. The mandrel is then clamped between the entry and exit openings so as to pre-tension the segments arranged thereabout.

The final spatial curve of the guide tube is then obtained by twisting the individual segments about the mandrel in a manner such that the relationship of the various inclinations of the individual segment face surfaces will produce the exact curve desired. Since the mandrel is preferably elastic, it permits bending thereof so as to achieve the desired guide tube curvature.

After the segments are arranged in the final, desired spatial curve, the diameter of the mandrel is expanded so as to secure the segments in this position and to prevent twisting thereof about the mandrel. The mandrel may be expanded, for example, by closing one end of the flexible pipe and connecting the other end to a fluid pressure source such as an air pump. The desired spatial curve is then finally fixed by casting the interior 3 of casing 1 with a binding agent, such as a synthetic resin, which hardens at the operating temperature of the apparatus. Since the segments are pressed firmly together by the pre-tensioning of the mandrel, their face surfaces 6 will lie snugly upon each other and the bonding agent will not be able to force its way therebetween. Furthermore, the solidification of the binder in triangular grooves 7 effects a clamping action which prevents axial movement of the segments. Subsequent to the final hardening of the bonding agent within casing 1, the fluid pressure within the flexible pipe or mandrel is relieved and it is removed from the interior of guide tube 2.

The present inventive process for the production of a curved guide tube is not restricted solely to the above-described example but, to the contrary, may be modified in various ways to arrive at the same result. For example, casing 1 may be replaced by a hollow casing mold which contains a form for the desired spatial curvature of guide tube 2. With this modified embodiment the interior diameter of the guide tube form is such that a space exists between it and the outer diameter of the segments which is filled by the bonding agent. After the final hardening of the bonding agent, the mold is removed and the mandrel is withdrawn as has been described in the above example.

The invention is hereby claimed as follows:

1. A method utilizing an expandable mandrel for producing a filament deflecting curved guide tube within a casing. having an entry and exit opening, the guide tube being formed of a plurality of contiguous abutting segments which are held in a fixed array within said casing by means of a bonding agent, said method comprising:

inserting the segments in a predetermined order about the mandrel, positioning said mandrel and segments within the casing so that the faces of the first and last segments abut the inner surface of the casing about its entry and exit openings, twisting said segments about said mandrel to a position wherein they form the desired spatial curvature of the guide tube, applying fluid pressure to said mandrel so as to expand its diameter and thereby hold said segments in said desired position, filling the interior of said casing with a bonding agent which hardens about said segments thereby fixing them in said desired position, relieving the fluid pressure from said mandrel so as to allow it to return to its original diameter prior to expansion, and withdrawing said mandrel from within said segment bores and casing.

2. The method of claim 1 further comprising pretensioning said mandrel after it is positioned within said casing.

* * * * *